US009268411B2

(12) United States Patent
Thelen et al.

(10) Patent No.: US 9,268,411 B2
(45) Date of Patent: Feb. 23, 2016

(54) METHOD AND SYSTEM FOR CONTROLLING A DISPLAY

(75) Inventors: Eric Thelen, Aachen (DE); Holger R. Scholl, Herzogenrath (DE)

(73) Assignee: KONINKLIJKE PHILIPS N.V, Eindhoven (NL)

( * ) Notice: Subject to any disclaimer, the term of this patent is extended or adjusted under 35 U.S.C. 154(b) by 1321 days.

(21) Appl. No.: 11/573,454

(22) PCT Filed: Aug. 5, 2005

(86) PCT No.: PCT/IB2005/052614
§ 371 (c)(1),
(2), (4) Date: Feb. 9, 2007

(87) PCT Pub. No.: WO2006/018775
PCT Pub. Date: Feb. 23, 2006

(65) Prior Publication Data
US 2009/0219303 A1    Sep. 3, 2009

(30) Foreign Application Priority Data

Aug. 12, 2004    (EP) ..................................... 04103898

(51) Int. Cl.
*G09G 5/00*    (2006.01)
*G06F 3/03*    (2006.01)

(52) U.S. Cl.
CPC .................................... *G06F 3/0304* (2013.01)

(58) Field of Classification Search
USPC ................................................. 345/634, 619
See application file for complete search history.

(56) References Cited

U.S. PATENT DOCUMENTS 5,138,304 A     8/1992   Bronson et al.
5,528,263 A *   6/1996   Platzker et al. ................ 345/156
(Continued)

FOREIGN PATENT DOCUMENTS

EP    1130906 A    9/2001
JP    02306294 A   12/1990
(Continued)

OTHER PUBLICATIONS

Translation of specification and claims for JP 2005-100279 A.*
(Continued)

*Primary Examiner* — M Good Johnson

(57) ABSTRACT

The invention describes a method for controlling a display, which method comprises the steps of displaying a portion of a visual presentation (VP) on the display (4) and aiming a pointing device (1) comprising a camera (2) at a target area (A) to indicate a target ($P_T$) in the visual presentation (VP), whereby the target ($P_T$) may be inside or outside of a portion (14) of the visual presentation (VP) currently visible on the display (4). An image (3) of the target area (A) aimed at by the pointing device (1) is generated and interpreted to determine the location of the target ($P_T$) within the visual presentation (VP). The visual presentation (VP) is adjusted as necessary to display that portion of the visual presentation (VP) which encompasses the target ($P_T$). The invention also describes a pointing device (1), a display control interface (8, 8', 8") and a system comprising such a pointing device (1) and display control interface (8, 8', 8") suitable for applying this method.

9 Claims, 6 Drawing Sheets

(56) References Cited

U.S. PATENT DOCUMENTS

| | | | |
|---|---|---|---|
| 5,936,618 A * | 8/1999 | Spiero et al. | 345/204 |
| 6,050,690 A * | 4/2000 | Shaffer et al. | 353/122 |
| 6,057,840 A * | 5/2000 | Durrani et al. | 715/786 |
| 6,297,804 B1 * | 10/2001 | Kashitani | 345/157 |
| 6,310,988 B1 * | 10/2001 | Flores et al. | 382/313 |
| 6,331,848 B1 | 12/2001 | Stove et al. | |
| 6,346,933 B1 * | 2/2002 | Lin | 345/157 |
| 6,704,000 B2 * | 3/2004 | Carpenter | 345/158 |
| 6,727,885 B1 | 4/2004 | Ishino et al. | |
| 6,972,776 B2 * | 12/2005 | Davis et al. | 345/684 |
| 7,176,881 B2 * | 2/2007 | Nishimura et al. | 345/156 |
| 7,187,412 B1 * | 3/2007 | Silverstein | 348/333.01 |
| 7,193,608 B2 * | 3/2007 | Stuerzlinger | 345/156 |
| 7,239,302 B2 * | 7/2007 | Kim | 345/165 |
| 7,400,777 B2 * | 7/2008 | Wang et al. | 382/254 |
| 7,423,660 B2 * | 9/2008 | Ouchi et al. | 345/684 |
| 7,477,784 B2 * | 1/2009 | Wang et al. | 382/209 |
| 7,502,507 B2 * | 3/2009 | Wang et al. | 382/182 |
| 7,683,881 B2 * | 3/2010 | Sun et al. | 345/156 |
| 7,768,527 B2 * | 8/2010 | Zhang | G06T 7/002 345/619 |
| 7,852,357 B2 | 12/2010 | Kato | |
| 7,869,618 B2 | 1/2011 | Thelen | |
| 7,952,560 B2 * | 5/2011 | Yoo et al. | 345/158 |
| 8,077,146 B2 | 12/2011 | Morimoto et al. | |
| 2001/0010514 A1 * | 8/2001 | Ishino | 345/158 |
| 2001/0022575 A1 * | 9/2001 | Woflgang | 345/156 |
| 2001/0030668 A1 | 10/2001 | Erten et al. | |
| 2002/0027548 A1 | 3/2002 | Yoneno | |
| 2003/0030622 A1 | 2/2003 | Vaarala | |
| 2003/0067441 A1 | 4/2003 | Hamana et al. | |
| 2003/0169233 A1 | 9/2003 | Hansen | |
| 2004/0246229 A1 * | 12/2004 | Yamada | 345/156 |
| 2005/0116931 A1 * | 6/2005 | Olbrich | 345/158 |
| 2005/0162384 A1 * | 7/2005 | Yokoyama | 345/156 |
| 2006/0258465 A1 * | 11/2006 | Lin et al. | 463/49 |

FOREIGN PATENT DOCUMENTS

| | | | |
|---|---|---|---|
| JP | 06308879 A | | 11/1994 |
| JP | H08335136 A | | 12/1996 |
| JP | 11327433 A | | 11/1999 |
| JP | 2002323850 A | | 11/2002 |
| JP | 2005100279 A | * | 11/2003 |
| JP | 2004157839 A | | 6/2004 |
| JP | 04035497 B2 | | 1/2008 |
| KR | 20010095815 A | | 11/2001 |
| WO | 03056505 A | | 7/2003 |
| WO | 2005062273 A1 | | 7/2005 |

OTHER PUBLICATIONS

Logitech* Cordless Presenter: Advertisement, Downloaded From http://www.logitech.com/pub/pdf/mouse/cordlesspresenter.pdf, Apr. 2002. 10 page document.

Olsen et al: "Laser Pointer Interaction"; CHI'01 Proceedings of the SIGCHI Conference on Human Factors in Computing Systems, ACM pp. 17-22, 2001.

* cited by examiner

METHOD AND SYSTEM FOR CONTROLLING A DISPLAY

This invention relates to a method and system for controlling a display, and to a pointing device and display control interface for such a system.

In recent years, developments in the areas of electronics and computing have resulted in an increased abundance of the supply of information which confronts us in our daily lives. Anyone can manage large amounts of information on a personal computer, and most modern consumer electronics devices offer the user a multitude of options and programming possibilities. Such content-related information is generally presented in a visible form on some kind of electronic display, such as a television screen, computer monitor, or on any kind of screen or backdrop, such as a wall. An obvious example is the virtual "desktop" shown on the screen of a personal computer, with all its collections of private or work-related data and information. In airports and railway stations, people can navigate through the display of an electronic information system, for example to locate a hotel on a map, or to order and pay for a ticket.

The content-related information presented visually might be a menu hierarchy, an image, a virtual desktop, a map etc. Quite often, more content-related information is available than can actually fit into the display—so that, for example, viewing a large image might necessitate decreasing the size of the image so that it fits in the display. However, the image might then be so small that the user can not see it properly, or cannot make out the details. Alternatively, the user might be able to scroll horizontally or vertically to other parts of the image or content, by moving a cursor to a dedicated region in the display, such as a scroll bar, and then clicking a mouse button or by pressing an appropriate key on a keypad or keyboard. The mouse or key clicks are usually interpreted by a control unit of the display to update the contents of the display.

One limitation of this type of display control is that the cursor must be moved fairly accurately to the required position in the scroll bar for the mouse or key click to have the required effect. Furthermore, the direction of scrolling is necessarily limited to horizontal and vertical movements, so that, when the user wishes to scroll diagonally, he must combine both horizontal and vertical scrolling, effectively doubling the required effort. Usually, scrolling is carried out at a constant rate, which is alright if the distance to be scrolled is relatively small, but which can be tedious if the user wishes to scroll to a point at the far end of a large content. Another disadvantage of scroll bars is that they take up room in the display, thus reducing the available display area, even though they scroll bars are only required when the user actually wants to see a different part of the image or visual presentation being displayed.

Therefore, an object of the present invention is to provide a more convenient and intuitive method of controlling a display.

To this end, the present invention provides a method for controlling a display, which method comprises displaying a portion of a visual presentation on the display and aiming a pointing device comprising a camera at a target area to indicate a target in the visual presentation, whereby the target may be inside or outside of the visual presentation currently visible on the display. An image is generated of the target area aimed at by the pointing device, and this target area image is interpreted to determine the location of the target within the visual presentation. The visual presentation is adjusted as necessary to display that portion of the visual presentation which encompasses the target point, which may be centred in the display or be off-centre.

An appropriate system for controlling a display using the method according to the present invention comprises a camera for generating images—in the direction in which the pointing device is aimed—of a target area that indicates a target in the visual presentation, whereby the target may be inside or outside of a portion of the visual presentation currently visible on the display. Furthermore, the system comprises an image analysis unit for analysing the images, a control signal generation unit for generating a control signal according to the results of the image analysis and a display control unit for applying the control signal to adjust the visual presentation in the display.

The method according to the invention opens whole new applications for a pointing device. With the aid of such a pointing device, a user can cause the contents of a display to be scrolled in any desired direction, not just horizontally or vertically, by simply aiming the pointing device at the presumed location of the desired contents. This intuitive application of the pointing device, together with its convenient pointing modality, combine to make the present invention a practical tool for use in controlling displays of any kind.

The dependent claims and the subsequent description disclose particularly advantageous embodiments and features of the invention.

A pointing device for use in the method according to the invention comprises at least a camera for generating images of the target area in the direction in which the pointing device is aimed.

The camera is preferably incorporated in the pointing device but might equally be mounted on the pointing device, and is preferably oriented in such a way that it generates images of the area in front of the pointing device targeted by the user. The 'target' aimed at by the user can be a point or region, and the 'target area' is the area in front of the pointing device which can be captured as an image—the target area image—by the camera. The camera might be constructed in a basic manner, or it might feature powerful functions such as zoom capability or certain types of filter.

Preferably, the image analysis unit for analysing the images and the control signal generation unit for generating a display control signal for the display are incorporated in a display control interface which interacts with a display control unit, for example the graphic card of a personal computer. Such a display control interface also comprises as necessary a sending unit for communicating the display control signal to the display control unit. As will be explained later, the display control interface can be incorporated in the pointing device or can be realised as an external unit, coupled with the pointing device by means of a suitable communication interface.

The display can be any kind of display, such as a projection on a backdrop, a television screen, a computer monitor, or the display of any appliance used to visually present information to a user, such as a ticket vending machine, tourist information point, etc. Anything that can be shown in the display is called "visual presentation" in the following, and can be a desktop environment, a menu hierarchy, a map, in fact, any kind of image. The size of the visual presentation is not limited to the dimensions of the display, and can be of any size greater or smaller than the dimensions of the display. In the following however, it is assumed that the visual presentation is actually greater than the display so that only a portion of the visual presentation can be shown at any one time in the display.

When the user aims the pointing device at a target in the visual presentation outside of the display, the contents of the display are preferably adjusted or updated by "scrolling" the desired portion into the visible area of the display. The scrolling can be smooth, so that the visual presentation appears to glide over the display, or incremental, so that the visual presentation is shifted in stages across the display. The scrolling mirrors the direction that the pointing device has taken, so that, if the pointing device was moved diagonally in a "north-east" direction, i.e. from the middle of the display beyond the top right corner of the display, the content or visual presentation will be scrolled in a "south-west" direction to show the targeted portion of the visual presentation. In short, the pointing device can be moved in any direction, not necessarily a straight line. Scrolling might commence as soon as the pointing device is moved by the user, to continually reflect its movements, and cease as soon as the pointing device comes to a rest. Alternatively, scrolling might first take place when the user has moved the pointing device and then indicated in some way that he is finished aiming it.

In a preferred embodiment of the invention, the rate of scrolling might be determined by the distance between the target and a reference point in the display, so that the further away from the display that the user aims the pointing device, the faster the rate of scrolling. This might be particularly appropriate in the case of very large visual presentation relative to the size of the display, so that scrolling or navigating through this large display does not take too long.

In a further preferred embodiment of the invention, the rate of scrolling might be determined by the rate of movement of the pointing device. For example, if the user moves the pointing device slowly away from the display, the visual presentation is proportionally slowly adjusted to show the desired contents. A rapid movement of the pointing device away from the display would result in a correspondingly rapid update or adjustment of the visual presentation in the display. The rate of movement and the path followed by the pointing device can be determined by applying appropriate analysis techniques or algorithms to the images taken with the camera. The pointing device might also incorporate a motion sensor for detecting and reporting its relative motion. Such a motion sensor might be activated as soon the user takes up or moves the pointing device from a resting state.

In an alternative embodiment of the invention, instead of updating the display by scrolling through the visual presentation, the display might be updated in an instant, without scrolling, so that the original contents are simply replaced at once by that portion of the visual presentation which encompasses the target aimed at by the pointing device.

The pointing device preferably features a control input for enabling or disabling the adjustment of the visual presentation in the display. Such a control input might be a button on the pointing device for the user to hold down when moving the pointing device away from the display and towards the desired target, and to release when the pointing device is aimed at the desired target. As long as the button is held down, scrolling is activated as a meaningful feature, and the visual presentation is updated according to the images recorded by the camera. As soon as the button is released, the pointing device can return to an inactive or resting state.

A useful addition to the pointing device might be a source of a concentrated beam of light, for example a laser, arranged in or on the pointing device in such a way that a concentrated beam of light issues in essentially the same direction in which the pointing device is aimed, preferably in the middle of the target area captured by the camera. Such a light source is commonly used in devices such as laser pointers. A light point appears wherever the beam of light impinges on an object in its path. Here, the light point can assist the user in aiming the pointing device at the desired target, since the light point shows him quite accurately in which direction he is aiming the pointing device.

To assist the user in "placing" that portion of the visual presentation that is currently shown in the display in its actual location in the overall visual presentation, it might be advantageous to offer the user the possibility of seeing the entire visual presentation at a glance, with the contours of the display around that portion of the visual presentation currently being shown. To this end, the entire visual presentation can be shown, suitably scaled down, in a small section of the display, or might briefly replace the actual contents of the display. The user can thus easily find his bearings in the visual presentation, and navigating through relatively large visual presentations is made easier. The user might even use the pointing device to initiate such a step. For example, he might wave the pointing device in a predefined manner, such as by describing a circle, or by flicking the pointing device back and forth. Alternatively, he might press a button on the pointing device while aiming the pointing device at the display, or might input an appropriate command via a keypad or keyboard associated with the display.

Another way of quickly placing the visible portion of the visual presentation in the overall picture, the pointing device may offer an additional 'zoom' function. Therefore, the amount of the visual presentation visible in the display may be preferably indicated by a distance between the pointing device and the display. For example, by aiming the pointing device at the display and simultaneously moving it backwards away from the display, the visual presentation is reduced or 'shrunk' so that more of it can be shown in the display. The user can thus easily find his bearings in the visual presentation. By moving the pointing device back in towards the display, the original magnification factor of the visual presentation can be restored.

To easily determine the target or target point at which the user is aiming the pointing device, the image analysis unit of the device control interface preferably tracks the path of the pointing device, by applying the usual image processing techniques or computer vision algorithms. The image of the target area might comprise image data concerning only significant points of the entire image, e.g. enhanced contours, corners, edges etc., or might be a detailed image with picture quality. The path calculated by the image analysis unit is then effectively "overlaid" on the visual presentation to identify that portion of the visual presentation which the user would like to see in the display.

A method of processing the target area images using computer vision algorithms might comprise detecting distinctive points in the target image, determining corresponding points in a template, and calculating the path of travel of the pointing device relative to some reference point associated with the display. The reference point might be the centre of the display, a corner of the display, or some other suitable point. The reference point might be fixed, i.e. predetermined, so that this one reference point is always used when calculating the path of travel of the pointing device. Alternatively, the reference point might be defined newly each time the user initiates a pointing action. To this end, the image analysis unit might simply take a suitable point from one of the first images, and use this point as the reference point for the tracking calculation.

For a display whose surroundings do not appreciably change, it might be expedient to provide the image analysis unit with images or templates of the display with its surroundings. Tracking the path of the pointing device is then reduced to the relatively simple task of matching the final target area image to one of the templates. The relative position of the target point to a reference point in the display can then easily be calculated, and the corresponding area in the visual presentation can equally easily be identified and shown in the display.

In the case of a display whose surroundings can appear different at different times, such as the screen or backdrop of a projector that can be set up in any location, the process of tracking the path of the pointing device can be simplified by supplying the image analysis unit with at least templates for the display, particularly for the edges of the display. The image analysis unit can then, by continually comparing successive images generated by the camera as the pointing device is moved, determine the direction in which the pointing device is being moved, and where the pointing device traverses an edge of the display. The image analysis unit can then pick out an easily identifiable object or point, and track that point over successive images. A number of such points might be picked out and tracked, until the final target area image is reached. By this stage, the image analysis unit will have tracked the path of the target point, and can apply this path to the visual presentation in order to identify the desired contents. The display can then be updated or adjusted to show these desired contents. The rate of movement of the pointing device can also be determined, by using these tracking techniques, so that a proportional rate of scrolling can be applied.

Another way of tracking the target point is by using a motion sensor to detect the direction in which the pointing device is moving, and the distance which it travels. The motion of the pointing device relative to a reference point in the display is detected using the motion sensor, which might be incorporated in the pointing device, or might even be worn by the user on the hand in which he holds the pointing device. For example, in some situations, the surroundings of the display may not always offer suitable points for assisting the image analysis unit in tracking the path of the target. A display might be set into a flat, uniform surface without any markings. In such a situation, a motion sensor might be used to supplement the tracking techniques already described, since the image analysis unit can only track the target point if at least a portion of the display is visible in each of the target area images, so that the size of the visual presentation is limited in this case by the dimensions of the display and the capabilities of the camera. This limitation can be eliminated by using a motion sensor to track the path of the pointing device. The initial images might be used to identify a reference point in the display, and the path of the target might thereafter be determined by using information supplied by the motion sensor, until the user indicates in some way—by pressing or releasing a button on the pointing device, for example, or by holding the pointing device steady for a predefined length of time—that he is now aiming the pointing device at the desired location in the visual presentation. In this case, if the user tilts the pointing device instead of actually moving it in a lateral direction, the net linear motion must be deduced from the angle by which the pointing device is tilted, taking into consideration the distance between the pointing device and the display.

Therefore, the path followed by the target point aimed at by the pointing device can preferably be calculated using a combination of tracking points in the images and motion sensor information.

Templates of the display and/or its surroundings can be stored in an internal memory of the display control interface, or might equally be accessed from an external source. Preferably, the display control interface, comprises an accessing unit with an appropriate interface for obtaining pre-defined templates for the display from, for example, an internal or external memory, a memory stick, an intranet or the internet. In this way, user of a display can update the templates whenever the display is moved to a new location, or whenever the surroundings of the display are changed, for example by taking pictures of the display and its surroundings and downloading them to the display control interface. A manufacturer of a display can supply the appropriate templates for a display, and update these as required.

Preferably, a display control interface for controlling the display might be incorporated in the pointing device. In this case, the display control interface does not need a receiver, since it can obtain the images directly from the camera. The image analysis and control signal generation can take place in the pointing device, and the control signals can be transmitted in appropriate form from the pointing device directly to the display.

On the other hand, since the capabilities of these units might be limited by the physical dimensions of the pointing device, which is preferably realised to be held comfortably in the hand, such an image analysis unit might suffice for rudimentary image analysis only, while more advanced image processing, necessitating a larger unit, might, along with the control signal generation, take place in an external display control interface.

In a particularly preferred embodiment of the invention, the pointing device incorporates a display control interface as well as a sending unit or transmitter for transmitting images to an external display control interface. Alternatively, the pointing device might altogether dispense with image analysis and control signal generation functions, allowing these tasks to be carried out by the external display control interface, thereby allowing the pointing device to be realised in a smaller, more compact form.

An external display control interface as described above might be a stand-alone device or might be incorporated into an already existing home entertainment device, a personal computer, or might be realised as a dedicated display control interface, or incorporated in a display control unit, such as are generally found in graphic cards. To receive information from the pointing device, the external display control interface features a receiving unit for receiving images.

Clearly, the display control interface is not limited to use with a single pointing device. Any number of different pointing devices might be used to send image data to the display control interface. Since it is generally desirable that only one user has control over the display at any one time, each pointing device might send some kind of identification number along with the images to the display control interface, which preferably has some kind of priority or queuing management to determine which pointing device is currently "active". An advanced realisation might foresee the pointing device sending an authorization code also along with image data, so that, for example, certain areas of the visual presentation are "out of bounds" for users without the necessary authorization. The authorization code might be hardwired in the pointing device, or might be downloaded through a suitable interface, or entered by the user in some way, for example by means of an appropriate control input.

The invention thus provides, in all, an easy and flexible way to control any type of display. For ease of use, the pointing device can be in the shape of a wand or pen in an elongated form that can be grasped comfortably by the user. The user can thus direct the pointing device at target while positioned at a comfortable distance from the display. Equally, the pointing device might be shaped in the form of a pistol. Furthermore, a light source might be incorporated in or mounted on the pointing device, serving to illuminate the area at which the pointing device is aimed, so that the user still use the pointing device to control a display, even in the dark.

The pointing device and display control interface combine to give a powerful display control system, for use in practically any kind of environment. For instance, it is conceivable that the system might find use in an airport or exhibition environment, where a traveller or guest can use the pointing device to navigate through extensive informative displays in a convenient and intuitive manner.

Other objects and features of the present invention will become apparent from the following detailed descriptions considered in conjunction with the accompanying drawing. It is to be understood, however, that the drawings are designed solely for the purposes of illustration and not as a definition of the limits of the invention.

In the drawings, like numbers refer to like objects throughout. The pointing device described is held and operated by a user, not shown in the drawings.

Figure 1:
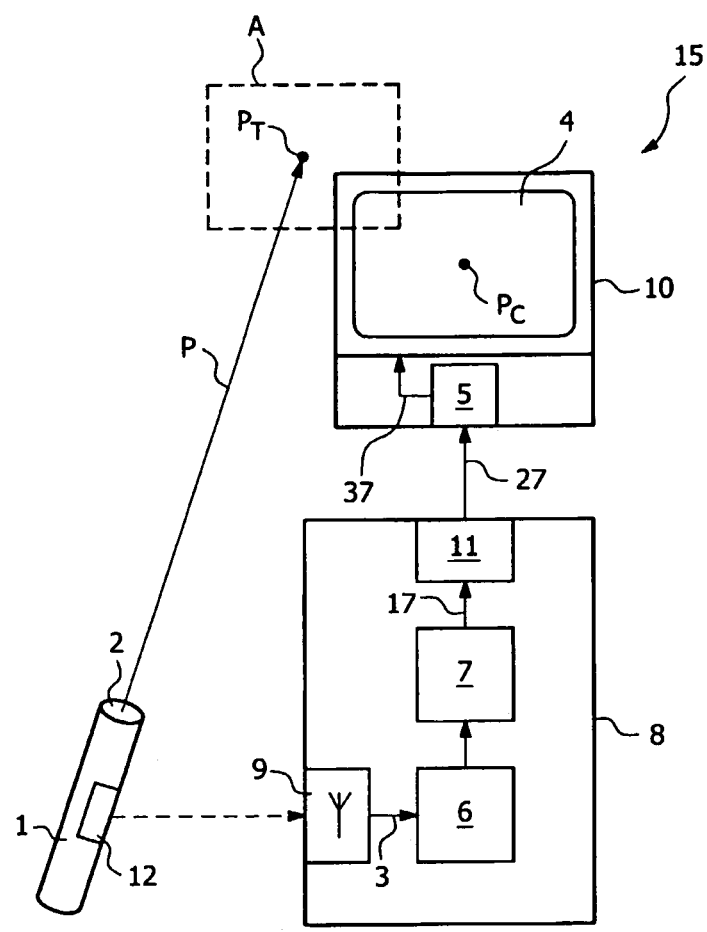
FIG. 1 is a schematic diagram of a system including a pointing device and a display control interface in accordance with an embodiment of the present invention.

FIG. 1 shows a system 15 for controlling a display 4. A particularly suitable application for the invention would be for a 'beamer', used to project a visual presentation onto a backdrop such as a projector screen. In this case, for the sake of clarity in the diagrams, the display 4 is the monitor of a device 10 such as a personal computer. Generally, such a device 10 incorporates a display control unit 5, for example a graphic card.

By aiming a pointing device 1 at an area within or outside of the display 4, the user can indicate a desired adjustment of a visual presentation VP being displayed. Such a visual presentation VP can be a menu hierarchy through which the user is navigating, or can be any type of image displayed on the screen 4. To this end, the user imagines he can "see" the entire visual presentation VP, and aims the pointing device 1 at that portion which he would like to have shown in the display 4. In this example, the user is assumed to have commenced the scrolling process by aiming the pointing device 1 somewhere in the display 4—where a reference point $P_C$ is located—and then moving the pointing device 1 out towards the left of the display 4, to where he imagines the desired part of the visual presentation VP is found.

A camera 2 in the pointing device 1 generates images of the target area A in front of the pointing device 1 in the direction D in which the pointing device 1 is aimed. Every image generated by the camera 2 is centred around a target point $P_T$. The images are sent by a sending unit 12 of the pointing device 1 to a display control interface 8.

A receiver 9 of the display control interface 8 receives the images 3 and forwards them to an image analysis unit 6, which analyses the images 3 to determine the relationship between the target point $P_T$ in the images 3 and the reference point $P_C$, in this case the centre of the display 4. To this end, tracking techniques as already described are used to identify and track points in successive images 3 to determine the path of the pointing device 1 and, if desired, its rate of motion. The results of the image analysis are forwarded to a control signal generator 7, which generates control signals 17 accordingly. These are passed to an application interface 11, which performs any necessary conversion before sending signals 27 in a form suitable for transmission to the display control unit 5.

The received signals 27 are processed by the display control unit 5 to give signals 37 which can be used to drive the monitor 4 of the personal computer 10.

The user is not limited to scrolling horizontally or vertically, but can cause the visual presentation VP to scroll diagonally, simply by aiming the pointing device 1 in the appropriate direction.

If the pointing device 1 is equipped with a laser light source from which a beam of laser light issues essentially in the direction of pointing, the ensuing point of light, which will be visible wherever it impinges on an object in the 'line of sight' of the pointing device 1, assists the user in correctly aiming in the desired direction. Preferably, the point of light coincides exactly with the target point.

Figure 2:
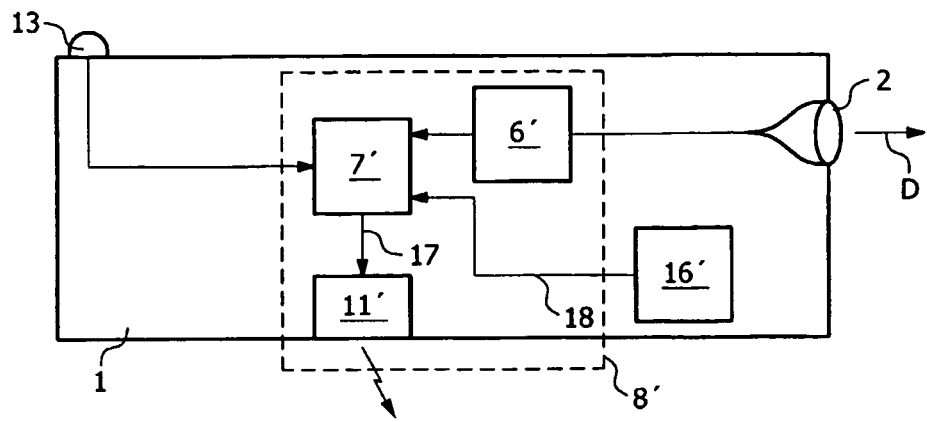
FIG. 2 is a schematic diagram of a pointing device in accordance with an embodiment of the present invention.

The display control interface need not be a stand-alone device. The functions of such an interface can be integrated in the pointing device itself. FIG. 2 shows the constituent modules of such a pointing device 1 in more detail. A camera 2 generates images 3 of an area in front of the pointing device 1 in the direction D of pointing. The pointing device 1 features an elongated form in this embodiment, so that the direction of pointing P lies along the longitudinal axis of the pointing device 1. The camera 2 is positioned towards the front of the pointing device 1 so that images 3 are generated of the area in front of the pointing device 1 at which a user, not shown in the diagram, is aiming.

These images 3 are passed to an image analysis unit 6', where they are analysed. The results of the analysis are sent to a control signal generator 7', where control signals 17 for the display are generated. In addition or as an alternative to determining the desired portion of the visual presentation VP by means of image analysis alone, a motion sensor 16 in the pointing device 1 can deliver information 18 about the position or motion of the pointing device 1 relative to the reference point. This information 18 can be used to determine the amount and direction of scrolling, or can be used supplementary to the image analysis.

In this example, the user can activate or deactivate the scrolling process by means of a control input 13, such as a button, mounted on the pointing device 1. The user can aim the pointing device 1 in the general desired direction, and then, when the user has properly aimed the pointing device 1, he can indicate his intention by pressing the control input 13. A suitable signal 14 from the control input 13 is forwarded to the control signal generator 7', indicating that the user has indicated a desired portion of the visual presentation VP. The control signal generator 7' generates a control signal 17 on the basis of the images 3, control input signal 14 and/or motion sensor information 18. The control signal 17 is transmitted in a wireless manner, e.g. Bluetooth, 802.11b or mobile telephony standards, by an application interface 11' of the display control interface 8' to a display unit, not shown in the diagram.

The pointing device 1 might continually generate images 3 and send control signals 17, or might cease operation automatically if it is not moved for a certain length of time. To this end, the motion sensor 16 might activate the pointing device 1 when first moved from a resting state, and might return the pointing device 1 to a resting state if no change in motion has been registered for a certain, predefined, length of time. Since the pointing device 1 is most likely powered by batteries, not shown in the diagram, it is expedient to only transmit data to the display control interface when the user actually aims the pointing device 1 at a point in the visual presentation VP, in order to prolong the lifetime of the batteries.

As illustrated in FIG. 2, being able to perform the image processing and control signal locally means the pointing device 1 does not necessarily need to communicate with a separate display control interface 8 as described in FIG. 1. Since the quality of the image analysis might be limited by the physical dimensions of the pointing device 1, which will most likely be realised in a small and practical format, this "stand-alone" embodiment might suffice for situations in which the accuracy of the image analysis is not particularly important, or in situations where the pointing device 1 is unable to communicate with an external display control interface 8.

This embodiment may of course be simply an extension of FIG. 1, so that the pointing device 1, in addition to the local display control interface 8', also avails of the sending unit 12 described in FIG. 1, allowing it to operate in conjunction with an external display control interface 8, in addition to its stand-alone functionality.

Figure 3:
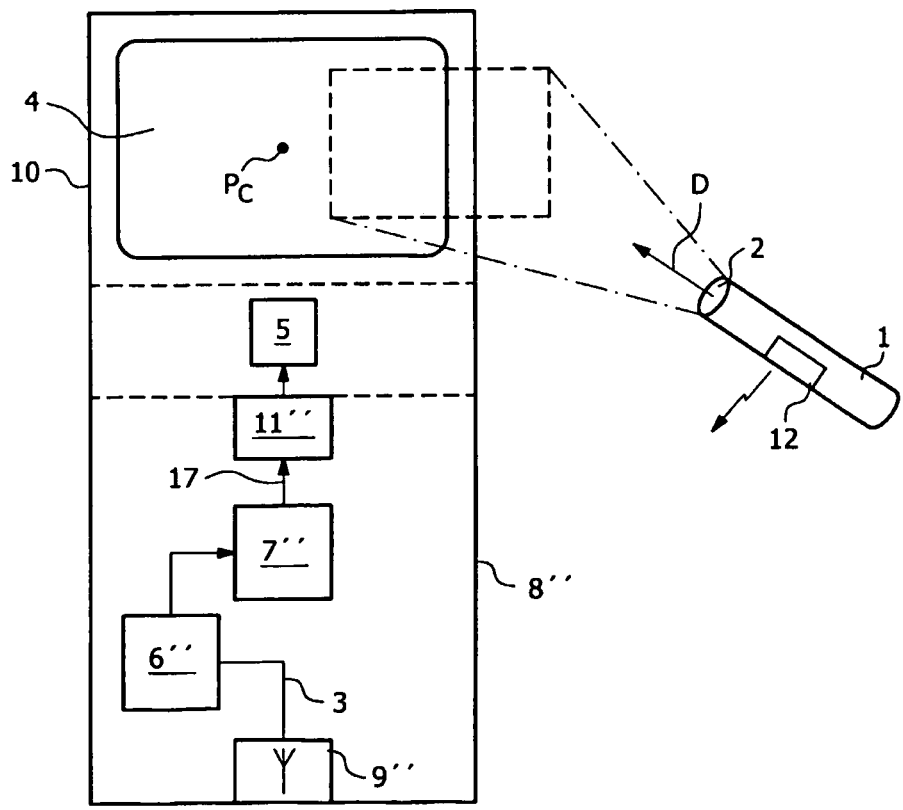
FIG. 3 is a schematic diagram of a pointing device and a display control interface in accordance with an embodiment of the present invention.

An alternative embodiment is shown in FIG. 3, where the display control interface 8" for a display 4 of a device 10, such as a television, is incorporated in the device 10 itself. A pointing device 1 for controlling the display 4 of the television 10 need only incorporate a sending unit 12 for sending images 3 of a target area A generated by a camera 2 of the pointing device 1. A receiver 9" receives the images 3 and forwards them to an image analysis unit 6", where they are interpreted and forwarded to a control signal generator 7". Here, a control signal 17 is generated and passed on to a display control unit 5, such as a graphic card, of the television 10, which causes the visual presentation VP to be adjusted accordingly in the television screen 4. The display control interface 8" can be a part of the display control unit 5, or vice versa.

FIGS. 4a-4h explain in more detail the process of scrolling a visual presentation VP in a display 4. A user is observing an image on the display 4. For the sake of pictorial clarity, the image or visual presentation VP in this example is a diagram of a stage in a chess game. The visual presentation VP is shown in its entirety in FIG. 4a.

Figure 4A:
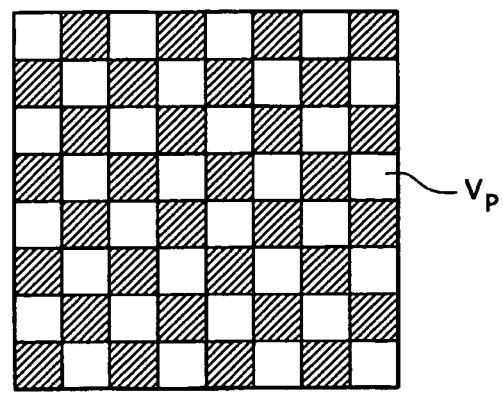
FIG. 4a is a schematic diagram of a visual presentation.
Figure 4B:
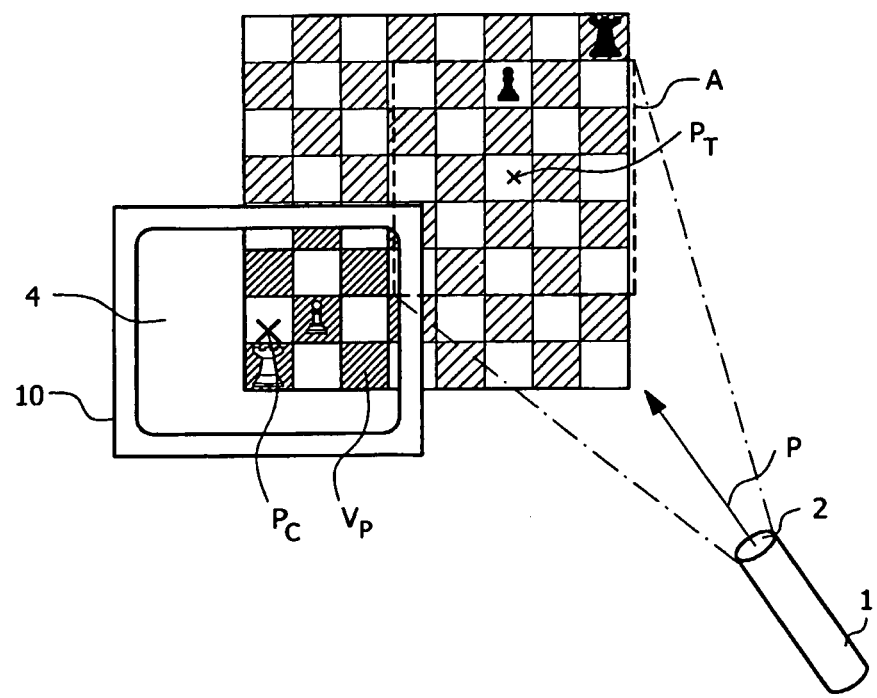
FIG. 4b is a schematic diagram of a pointing device and a display showing a first portion of a visual presentation.

As shown in FIG. 4b, only a portion of the visual presentation VP—in this case the lower left corner—can fit in the display 4, which may be the display of a device 10 such as a television, personal computer, or similar. The user in this example wishes to pan to the upper right corner of the visual presentation VP. To this end, he moves the pointing device from pointing at the display 4 to an imaginary point in the upper right corner of the visual presentation VP, as if he could "see" the visual presentation VP in its entirety.

Figure 4C:
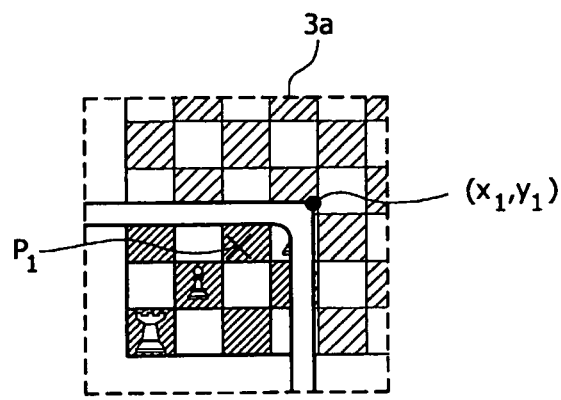
FIGS. 4c-4f show target area images of a visual presentation.
Figure 4D:
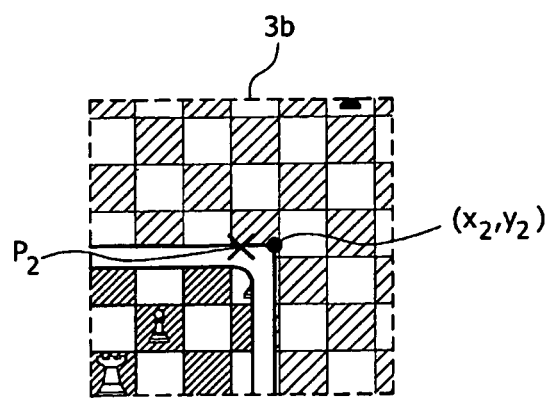
Figure 4E:
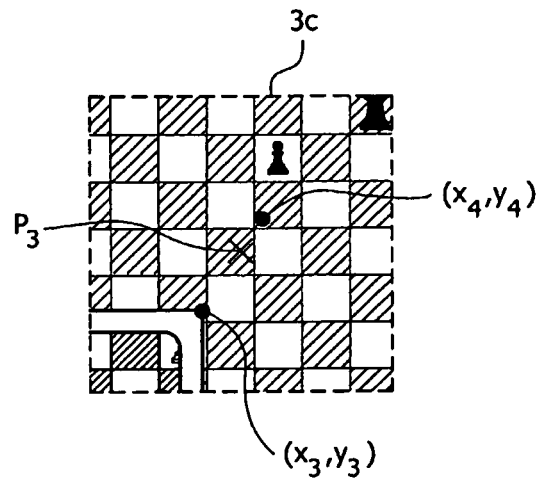
Figure 4F:
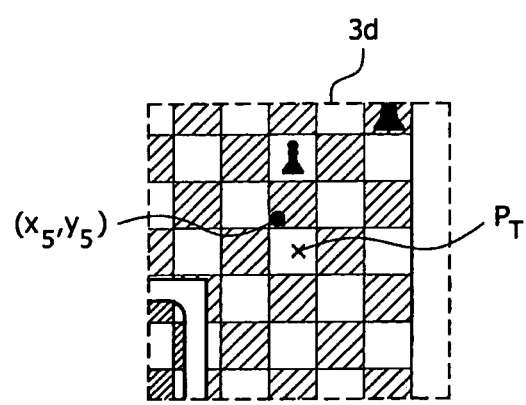

While the user moves the pointing device 1 away from the display 4 and towards the desired target, the camera 2 generates successive images of the areas pointed at by the pointing device 1. In the diagram, the entire visual presentation VP is shown, whereby the portion of the visual presentation VP not shown in the display 4 is lighter in color, and only serves to illustrate the 'virtual' visual presentation that the user images when aiming the pointing device 1 at a desired target $P_T$ in the portion of the visual presentation not shown in the display. For the sake of simplicity, only four such images 3a, 3b, 3c, 3d are shown in FIGS. 4c-4f. In reality, the number of images might be considerably greater, depending on the capability of the camera 2 and the desired degree of accuracy. In FIGS. 4c-4e, which show the target area images 3a, 3b, 3c made on the way to the final image 3d shown in FIG. 4f, the "transient" target points are denoted by P1, P2, P3.

To determine the direction in which the pointing device 1 is being moved, the image analysis unit locates sets of corresponding points in consecutive images. To this end, pattern matching techniques might be used, where images showing an edge or corner of the display are compared with templates of the display to track the motion of the pointing device 1.

The upper right corner of the display 4 gives a point in the first target area image 3a with target area image coordinates $(x_1, y_1)$. This same point in the second image has moved to a new position in the target area image 3b, and now has coordinates $(x_2, y_2)$. Similarly, in the third image 3c, the upper right corner of the display now has the coordinates $(x_3, y_3)$. By calculating the direction in which this point appears to "move" in successive images, the image analysis unit can calculate the path of travel of the pointing device 1. New points are identified as necessary, for example easily identifiable points such as corners. Here, an additional point with coordinates $(x_4, y_4)$ is identified in target area image 3c, since the point corresponding to the upper right corner of the display 4 is threatening to disappear from the target area aimed at by the pointing device 1. In the final image 3d, the new point has "moved", and now has coordinates $(x_5, y_5)$.

Figure 4G:
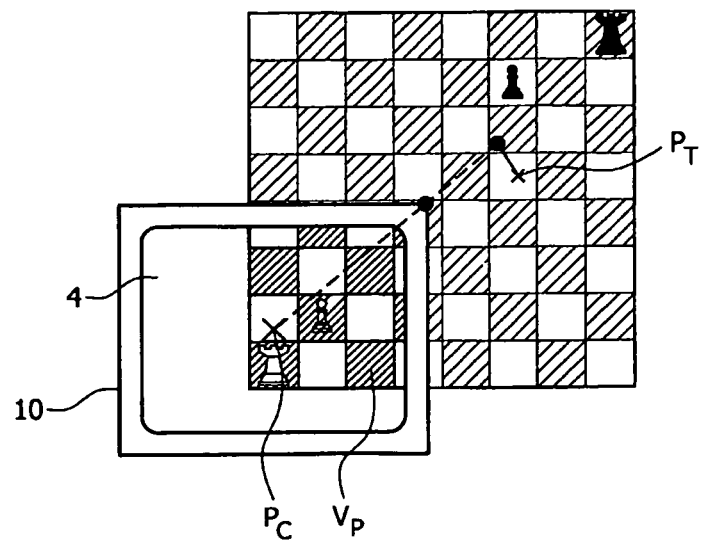
FIG. 4g is a schematic diagram of a display and a visual presentation, where a portion of the visual presentation is shown on a display.
Figure 4H:
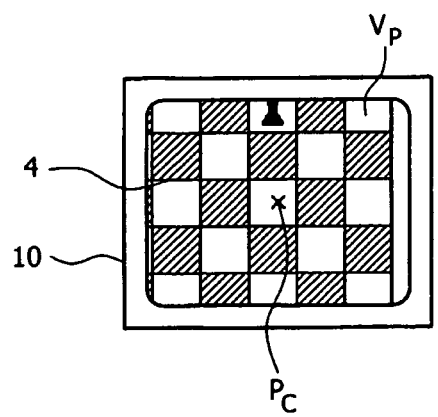
FIG. 4h is a schematic diagram of a display showing a second portion of a visual presentation.

By the time the final image 3d has been analysed, the image analysis unit has enough data to calculate the path travelled by the points, as shown in FIG. 4g, and can therefore calculate the position of the final target point $P_T$ relative to the reference point $P_C$. This information in turn allows the control signal generation unit to generate the required control signals for scrolling the visual presentation VP to show that portion which encompasses the final target point $P_T$. The desired portion of the visual presentation VP is then shown on the screen 4 as shown in FIG. 4h.

Although the present invention has been disclosed in the form of preferred embodiments and variations thereon, it will be understood that numerous additional modifications and variations could be made thereto without departing from the scope of the invention. As an alternative to the pen shape, the pointing device could for example also be a personal digital assistant (PDA) with a built-in camera, or a mobile phone with a built-in camera.

For the sake of clarity, it is also to be understood that the use of "a" or "an" throughout this application does not exclude a plurality, and "comprising" does not exclude other steps or elements. A "unit" may comprise a number of blocks or devices, unless explicitly described as a single entity.

The invention claimed is:

1. A method for controlling a display, said method comprising the steps:
    displaying a portion of a visual presentation on a display, the visual presentation having an area that may exceed a display area of the display;
    aiming a pointing device comprising a camera at a target point in the visual presentation, the target point being selected from locations in said visual presentation, said locations including both locations in the portion of the visual presentation displayed in the display area of the display and locations in a further portion of the visual presentation outside of the display area of the display;
    capturing an image of a target area surrounding the target point being aimed at by the pointing device;
    interpreting the target area image to determine the location of the target point within the visual presentation; and scrolling the visual presentation in the display, and displaying that portion of the visual presentation corresponding to the target area surrounding the target point;

wherein the scrolling of the visual presentation is characterized by at least one of the following:
(a) the scrolling is performed diagonally, with simultaneous horizontal and vertical movement;
(b) the scrolling is performed in a non-linear fashion based upon movement of the pointing device;
(c) the scrolling is performed at a variable scrolling rate based upon movement or positioning of the pointing device;
(d) the scrolling is based on the aiming, capturing, and interpreting steps, without use of any scroll bars; and
(e) the scrolling is controlled at least in part based upon output of a sensor operatively coupled to the pointing device, wherein the sensor is arranged to generate a sensor output signal indicative of motion.

2. The method according to claim 1, wherein the scrolling is performed at a variable scrolling rate that depends on the location of the target point in the target area relative to a point in the display.

3. The method according to claim 1, wherein the scrolling is performed at a variable scrolling rate that depends on the motion of the pointing device relative to the visual presentation.

4. The method according to claim 1, wherein an amount of the visual presentation visible in the display is varied according to variation of a distance between the pointing device and the display.

5. The method according to claim 1, wherein the scrolling of the visual presentation is performed diagonally, with simultaneous horizontal and vertical movement.

6. The method according to claim 1, wherein the scrolling of the visual presentation is performed in a non-linear fashion based upon movement of the pointing device.

7. The method according to claim 1, wherein the scrolling of the visual presentation is based on the aiming, capturing, and interpreting steps, without the use of any scroll bars.

8. The method according to claim 1, wherein the scrolling of the visual presentation is controlled at least in part based upon the output of a sensor operatively coupled to the pointing device, wherein the sensor is arranged to generate a sensor output signal indicative of motion.

9. The method according to claim 1, wherein said method further comprises the step of:
capturing or supplying at least one template image of at least one of (a) the display and (b) surroundings of the display,
wherein the interpreting step utilizes the at least one template image.

* * * * *